United States Patent [19]
Kitamura et al.
[11] 4,416,149
[45] Nov. 22, 1983

[54] METHOD AND DEVICE FOR DETECTING ENGINE IDLING

[75] Inventors: Hidetoshi Kitamura, Higashikurume; Hirohisa Kato, Tokyo, both of Japan
[73] Assignee: Nissan Motor Co., Ltd., Kanagawa, Japan

[21] Appl. No.: 348,683
[22] Filed: Feb. 16, 1982
[30] Foreign Application Priority Data
Apr. 9, 1981 [JP] Japan ................................ 56-52384
[51] Int. Cl.³ ........................................ G01M 15/00
[52] U.S. Cl. ........................................ 73/118
[58] Field of Search .................. 73/118; 123/494, 478, 123/480

[56] References Cited
U.S. PATENT DOCUMENTS
4,217,863 8/1980 Ezoe .................................. 123/494
4,311,042 1/1982 Hosoya et al. ....................... 73/118
FOREIGN PATENT DOCUMENTS
2652916 5/1978 Fed. Rep. of Germany .
2927881 1/1981 Fed. Rep. of Germany .
OTHER PUBLICATIONS
Motronic—"A New Electronic System for the Control of Spark Ignition Engines", pp. 203-212 (May 1980).

*Primary Examiner*—Jerry W. Myracle
*Attorney, Agent, or Firm*—Schwartz, Jeffery, Schwaab, Mack, Blumenthal & Koch

[57] ABSTRACT
Detection of engine idling is preformed by detecting the position of a throttle valve corresponding to idling and discriminating an intake air flow rate in a range of idle air flow rate. A signal indicative of engine idling is produced when both the throttle valve is in idling position and the air flow rate is less than the idle air flow rate.

5 Claims, 4 Drawing Figures

METHOD AND DEVICE FOR DETECTING ENGINE IDLING

BACKGROUND OF THE INVENTION

The present invention relates generally to a method and a device for detecting engine idling. More particularly, the invention relates to a method and device for detecting engine idling based on both the throttle valve angular position and the intake air flow rate.

Generally, engine idling is detected by a throttle switch which is closed when the throttle valve is fully closed and/or the throttle valve open angle is less than a threshold value. Such a throttle switch requires relatively high accuracy for detection of the throttle angular position to produce a signal in response to the shifting of the throttle valve into the engine idle condition. Particularly, for an engine having a relatively large diameter induction system, such as, for example, the induction passage having a single barrel type throttle chamber, variation of air flow rate in response to varying of the throttle valve angular position is remarkable to make the detection of idling condition difficult. Therefore, for such engine, it is important to provide an accurate throttle switch.

On the other hand, the engine idling condition may be detected by detecting the air flow rate lower than a threshold value defining the idle air flow rate. If the engine idling condition is detected based on the air flow rate, the throttle switch will not be required to have as high an accuracy as that otherwise required.

SUMMARY OF THE INVENTION

Therefore, it is an object of the invention to provide a method and device for detecting engine idling condition based on both the throttle valve angular position and the air flow rate.

Another and specific object of the invention is to provide a method and device which detects an engine idling condition to produce a signal indicating that the engine is in an idle condition when the throttle switch is turned on and the air flow rate is less than a threshold value.

To accomplish the above-mentioned and other objects of the invention, there is provided a method for detecting an engine idling condition, utilizing a throttle valve angular position with open angle less than a threshold angle value and an intake air flow rate, which is determined by an air flow meter provided in an air induction passage of an engine. The determined air flow rate is compared with a threshold value to distinguish if the determined rate is more than a idle air flow rate. A signal representative of an engine idling condition is produced when both conditions are satisfied, namely, when the throttle valve open angle is less than the threshold angle value and the intake air flow rate is less than the threshold value.

Further to accomplish the objects, there is provided a device for detecting an engine idling condition, which includes a throttle angle switch producing a signal when the throttle valve open angle is less than the threshold angle value, an air flow meter for determining intake air flow rate, a means for producing a signal when the intake air flow rate determined by the air flow meter is less than a threshold value, and a means for producing a signal representative of the engine idling condition when both of the signals are present, which signals are respectively representative of the throttle valve open angle being less than the threshold angle value and the intake air flow rate is less than the threshold value.

Therefore, according to the present invention, the throttle switch is not require to have high accuracy for detecting the engine idling condition, thus making manufacturing and assembling of the throttle switch easier.

BRIEF DESCRIPTION OF THE DRAWINGS

The present invention will be more fully understood from the detailed description given herebelow and from the accompanying drawings of the preferred embodiment of the present invention, which, however, should not be taken as limitative to the invention, but for elucidation and explanation only.

In the drawings.

DESCRIPTION OF THE PREFERRED EMBODIMENTS

Figure 1:
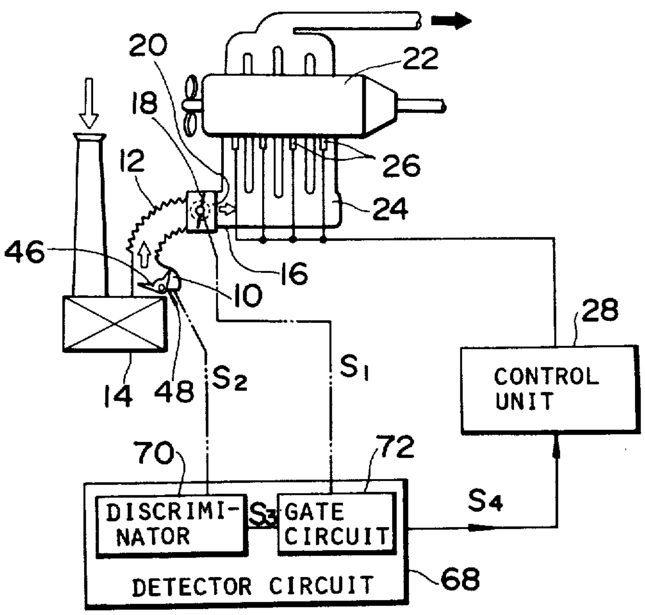
FIG. 1 is a schematic diagrammatical illustration of the preferred embodiment of an engine idling detecting device according to the present invention.

Referring now to the drawings, particularly to FIG. 1, an engine idling detecting device includes an air flow meter 10 disposed in an air induction passage 12 of an internal combustion engine, downstream of an air cleaner 14. A throttle switch 16 is associated with a throttle valve 18 disposed within a throttle chamber 20 in the air induction passage 12. The throttle valve 18 is, in turn, connected to an accelerator pedal (not shown) via a linkage so that its angular position, called open angle, will vary in response to depression or release of the accelerator pedal. The throttle valve 18 controls the amount of intake air delivered to combustion chambers defined in an engine cylinder block 22 through an intake manifold 24. Fuel injectors 26 are provided in the intake manifold 24 to inject controlled amounts of fuel therein. The fuel injectors 26 are electrically connected to a control unit 28 such as a microcomputer which controls the ratio and timing of the open periods and closed periods thereof.

Figure 2:
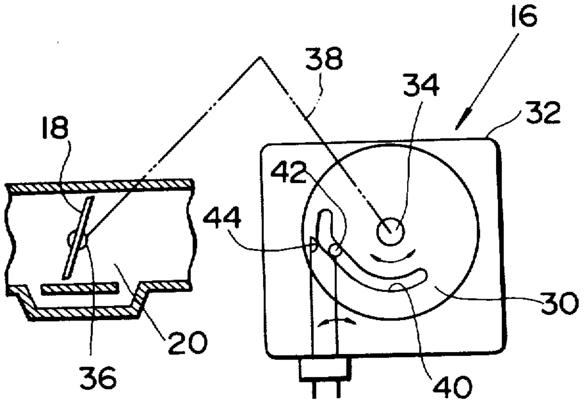
FIG. 2 is an explanatory illustration showing a construction of a throttle switch applied to the engine idling detecting device of FIG. 1.

As shown in FIG. 2, the throttle switch 16 comprises a rotatable member 30 rotatably disposed within a throttle switch housing 32. The rotatable member 30 is secured to an axle 34 which is connected with the pivot axle 36 of the throttle valve 18 via a linkage 38 so that it may rotate integrally with the pivot axle 36 in response to accelerator pedal movement. The rotatable member 30 is formed wih an irregularly-curved slot 40. A movable contact 42 of the throttle switch is placed in the curved slot 40 opposite a stationary contact 44. The slot 40 is adapted to allow the movable contact 42 to contact the stationary contact 44 at a position corresponding to a predetermined throttle valve angular position. The position in which the contacts 42 and 44 come into contact is selected to correspond to the fully-closed position of the throttle valve or to a throttle valve open angle less than a predetermined value, whichever more accurately indicates engine idling.

Therefore, the contacts 42 and 44 close a circuit to produce a throttle angle signal $S_1$ whenever the throttle valve is fully closed or the throttle valve open angle is less than the predetermined value.

Figure 3:
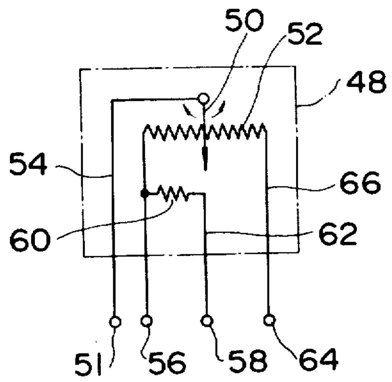
FIG. 3 is a schematic diagram of an air flow meter circuit, which air flow meter circuit is applied to the engine idling detecting device of FIG. 1.
Figure 4:
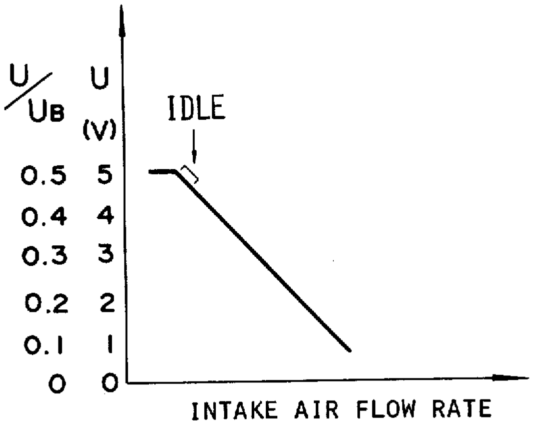
FIG. 4 is a graph showing variation of air flow meter output in relation to intake air flow rate.

The air flow meter 10 measures the intake air flow rate, and produces an air flow meter signal $S_2$ proportional to the intake air flow rate. The air flow meter 10 is provided with a flap 46 extending into the air induction passage 12. As the air flows through the induction passage, the flap 46 rotates to vary the resistance value of a potentiometer 48. As seen in FIG. 3, the potentiometer 48 comprises a movable contact 50 connected to a resistor 52 to produce a signal having a value proportional to the position of the movable contact 50. A terminal 51 is connected to the movable contact 50 via a lead 54 and a terminal 58 is connected to a terminal 56 via a resistor 60 and a lead 62. The terminal 56 is, in turn, connected to a terminal 64 via the resistor 52 and a lead 66. In this circuit construction, potential U across terminals 51 and 56 corresponds to the position of the movable contact 50 and varies with intake air flow rate as illustrated in FIG. 4. On the other hand, the potential $U_B$ across terminals 58 and 64 is a constant value determined by the resistance values of the resistors 52 and 60. The potentiometer 48 outputs the air flow meter signal $S_2$, the value of which represents the potential U across the terminals 51 and 56 or $U/U_B$ which in turn correspond to the position of the movable contact 50.

Both the throttle angle signal $S_1$ and the air flow meter signal $S_2$ are conducted to a detector circuit 68. The detector circuit 68 incorporates a discriminator 70 receiving the air flow meter signal $S_2$. The discriminator 70 compares the air flow meter signal value with a reference value which represents a threshold value corresponding to the maximum idle air flow rate. The discriminator 70 produces a discriminator signal $S_3$ when the air flow meter signal value is less than the reference value. The detector circuit 68 further incorporates a gate circuit 72 such as an AND gate to produce a detector signal $S_4$ indicative of the engine idling when the signals $S_1$ and $S_3$ indicate respective conditions corresponding to idling.

The detector signal $S_4$ may be fed to the control unit 28 as a control parameter for use in controlling engine operation.

What is claimed is:

1. A device for detecting engine idling comprising:
   first means for detecting a throttle valve angle position and producing a first signal when the throttle open angle is less than a predetermined angle;
   second means for determining intake air flow rate and producing a second signal having value indicative of the determined air flow rate;
   third means for producing a third signal when the second signal value is less than a predetermined value; and
   fourth means responsive to said first and third signals for producing a detector signal indicative of engine idling when said first and third signals are produced at the same time.

2. A device as set forth in claim 1, wherein said first means is a throttle switch.

3. A device as set forth in claim 1 or 2, wherein said predetermined value is representative of a maximum idle air flow rate, and said third means produces said third signal when the air flow rate represented by said second signal value is less than said maximum idle air flow rate.

4. A method for detecting engine idling comprising the steps of:
   detecting a throttle valve angle position in which throttle valve open angle is less than a predetermined angle;
   determining an intake air flow rate;
   discriminating whether the determined air flow rate is less than a predetermined value; and
   producing a signal indicative of engine idling when the throttle valve is at an open angle less than the predetermined angle and air flow rate is less than the predetermined value.

5. A method as set forth in claim 4, wherein said predetermined value to be compared to the air flow rate corresponds to the maximum idle air flow rate.

* * * * *